United States Patent
Kammer et al.

(10) Patent No.: US 8,806,851 B2
(45) Date of Patent: Aug. 19, 2014

(54) METHOD FOR REDUCING EMISSION OF NITROGEN OXIDE IN A MOTOR VEHICLE HAVING A LEAN BURNING INTERNAL COMBUSTION ENGINE

(75) Inventors: Cyrill Kammer, Bad Urach (DE); Berthold Keppeler, Owen (DE); Jochen Lahr, Stuttgart (DE); Markus Paule, Korb (DE); Anke Traebert, Stuttgart (DE); Nicole Werquet, Stuttgart (DE); Axel Zuschlag, Kernen (DE)

(73) Assignee: Daimler AG, Stuttgart (DE)

( * ) Notice: Subject to any disclaimer, the term of this patent is extended or adjusted under 35 U.S.C. 154(b) by 538 days.

(21) Appl. No.: 12/680,338

(22) PCT Filed: Sep. 9, 2008

(86) PCT No.: PCT/EP2008/007349
§ 371 (c)(1),
(2), (4) Date: Sep. 15, 2010

(87) PCT Pub. No.: WO2009/043425
PCT Pub. Date: Apr. 9, 2009

(65) Prior Publication Data
US 2011/0005199 A1    Jan. 13, 2011

(30) Foreign Application Priority Data
Sep. 28, 2007 (DE) .......... 10 2007 046 460

(51) Int. Cl.
*F01N 3/00* (2006.01)
(52) U.S. Cl.
USPC ............................................. 60/274; 60/286
(58) Field of Classification Search
CPC ....... F01N 9/00; F01N 3/0814; F01N 3/0842; F01N 3/208; F01N 2250/12; F01N 2610/02; Y02T 10/47; Y02T 10/24
USPC .................................... 60/274, 286, 295, 299
See application file for complete search history.

(56) References Cited

U.S. PATENT DOCUMENTS 6,125,629 A * 10/2000 Patchett ........................ 60/286
6,508,057 B1   1/2003 Bouchez et al.
(Continued)

FOREIGN PATENT DOCUMENTS

DE    10 2005 049 655 A1   4/2007
EP       1 008 379 A1   6/2000
(Continued)

OTHER PUBLICATIONS

International Search Report/Written Opinion dated Dec. 29, 2008 (13 pages, including translation of relevant portions of the ISR).
(Continued)

*Primary Examiner* — Thomas Denion
*Assistant Examiner* — Matthew T Largi
(74) *Attorney, Agent, or Firm* — Crowell & Moring LLP

(57) ABSTRACT

In a method for reducing the emission of nitrogen dioxide in a motor vehicle having an exhaust gas purification system having an SCR catalytic converter with adsorption centers for nitrogen oxides, an exhaust gas enriched with ammonia is supplied to the SCR catalytic converter above an operating temperature. Below the operating temperature, the exhaust gas supplied to the SCR catalytic converter is enriched with a material such that an adsorption of nitrogen oxides is inhibited at corresponding adsorption centers of the SCR catalytic converter. In order to reduce the overall $NO_x$ emissions below a first, predeterminable amount, an exhaust gas enriched with ammonia is supplied to the SCR catalytic converter and the $NO_2$ portion of the total $NO_x$ emissions is reduced below a second, predeterminable amount in that $NO_2$ is converted with hydrocarbons stored in the SCR catalytic converter.

13 Claims, 1 Drawing Sheet

(56) References Cited

U.S. PATENT DOCUMENTS

| | | |
|---|---|---|
| 6,516,607 B1 | 2/2003 | Bueck et al. |
| 7,063,642 B1 * | 6/2006 | Hu et al. ............ 477/100 |
| 2007/0042495 A1 * | 2/2007 | Pavlova-MacKinnon et al. ............ 436/55 |
| 2007/0089406 A1 | 4/2007 | Doring |
| 2009/0007548 A1 | 1/2009 | Itoh |
| 2010/0037596 A1 | 2/2010 | Toshioka et al. |

FOREIGN PATENT DOCUMENTS

| | | |
|---|---|---|
| EP | 1 777 384 A1 | 4/2007 |
| JP | 11-343834 A | 12/1999 |
| JP | 2000-257419 A | 9/2000 |
| JP | 2007-239500 A | 9/2007 |
| JP | 2008-231966 | 10/2008 |
| RU | 2 219 354 C2 | 12/2003 |
| WO | WO 2004/022935 A1 | 3/2004 |
| WO | WO 2004/061278 A1 | 7/2004 |
| WO | WO 2008026002 A1 * | 3/2008 ............ B01D 53/94 |

OTHER PUBLICATIONS

Japanese Office Action dated Oct. 30, 2012, issued in corresponding Japanese Application No. 2010-526180 (7 pages).

* cited by examiner

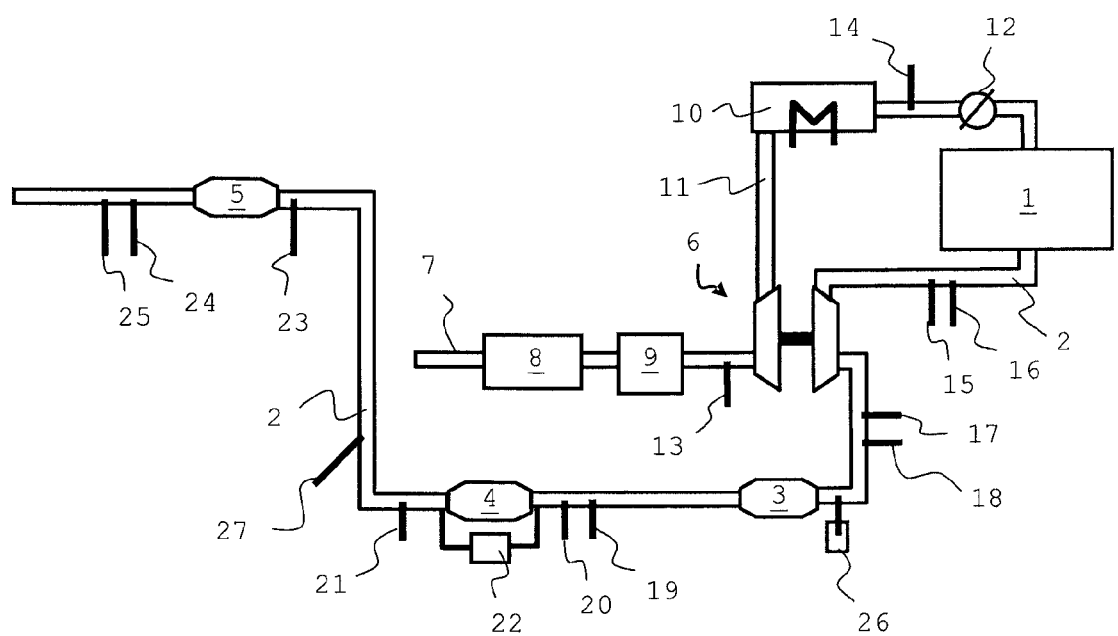

METHOD FOR REDUCING EMISSION OF NITROGEN OXIDE IN A MOTOR VEHICLE HAVING A LEAN BURNING INTERNAL COMBUSTION ENGINE

This application is a national stage of PCT International Application No. PCT/EP2008/007349, filed Sep. 9, 2008, which claims priority under 35 U.S.C. §119 to German Patent Application No. 10 2007 046 460.8, filed Sep. 28, 2007, the entire disclosure of which is herein expressly incorporated by reference.

BACKGROUND AND SUMMARY OF THE INVENTION

The invention relates to a method for reducing nitrogen dioxide emissions from a motor vehicle having a lean burning internal combustion engine with a connected exhaust gas purification system comprising an SCR catalytic converter.

German patent document DE 10 2005 049 655 A1 discloses a known method for reducing the emission of nitrogen dioxide ($NO_2$) in a lean burning internal combustion engine with an exhaust gas purification system having a catalytic converter with nitrogen oxide oxidation activity. In this method, the portion of materials is varied during the operation of the internal combustion engine, which compete with the oxidation of nitrogen monoxide (NO). As a result, the $NO_2$ content in the exhaust gas downstream of the catalytic converter with NO oxidation activity takes on an amount preferred with the view to a following exhaust gas aftertreatment. The main focus is thus on a selective reduction of nitrogen oxides ($NO_x$) carried out at an SCR catalytic converter or on an oxidation of soot particles deposited at a particle filter.

It is indeed avoided by the method that an unnecessary or disadvantageous excess of $NO_2$ is formed with regard to the mentioned following exhaust gas aftertreatment processes, but a release of $NO_x$ in general and $NO_2$ especially to the environment does not reduce reliably to a desired amount. An undesired emission of $NO_x$ and especially of $NO_2$ at lower exhaust gas temperatures is especially not avoided in a reliable manner.

One object of the present invention to provide a method which achieves a reduction of the nitrogen dioxide emission of an internal combustion engine over a wide range of operations and especially with critical low exhaust gas temperatures in this regard.

This and other objects and advantages are achieved by the method according to the invention in which, above an operating temperature at which a noticeable reduction of nitrogen oxides with ammonia can take place in an SCR catalytic converter, an exhaust gas enriched with ammonia is supplied to an SCR catalytic converter, that has adsorption centers for nitrogen oxides.

The SCR catalytic converter, which is enabled for the catalyzation of a selective $NO_x$ reduction under oxidizing conditions by means of $NH_3$, has adsorption centers where nitrogen oxides ($NO_x$) can adsorb, so that they are withdrawn from the exhaust gas. This ability to absorb $NO_x$ affects the nitrogen oxides NO and/or $NO_2$, while adsorption of other nitrogen oxides such as $N_2O$, $N_2O_3$, $N_2O_4$ and other, especially polar materials, remains possible. The following text refers to "$NO_x$", if nitrogen monoxide (NO) and also one of the other mentioned nitrogen oxides can be affected. However, with regard to nitrogen dioxide ($NO_2$), only this nitrogen oxide is affected.

Below the operating temperature referred to above, the exhaust gas supplied to the SCR catalytic converter is enriched with a material according to the invention, which adsorbs at least partially on the adsorption centers of the SCR catalytic converter, in such a manner that an adsorption of $NO_x$ is inhibited at these adsorption centers.

The device for enriching the exhaust gas with ammonia and/or a reagent enabled for splitting off ammonia is preferably an addition device, which can supply an externally provided reduction agent, such as ammonia ($NH_3$), urea, ammonium carbamate or ammonium formiate, to the exhaust gas from the exterior. An addition device for aqueous urea solution is preferred, which can be injected into the exhaust gas. Due to a thermolysis and/or hydrolysis, $NH_3$ is released from the urea in the exhaust gas at increased temperatures, with which a selective $NO_x$ reduction takes place at the SCR catalytic converter under oxidizing conditions. The mentioned device can however also be a reactive unit integrated in the exhaust gas purification system and flown through by the exhaust gas, which can generate ammonia from exhaust gas components contained per se in the exhaust gas or can generate exhaust gas components subsequently guided to the exhaust gas in a complete or partial manner. For this, a catalytic unit as for example a three-way or nitrogen storage catalytic converter is considered primarily, which can reduce supplied or stored nitrogen oxides to ammonia by means of exhaust gas components acting in a reducing manner.

In this connection, the operating temperature of the SCR catalytic converter referred to above, is meant to be a temperature above which a noticeable $NO_x$ reduction is enabled at the SCR catalytic converter with supplied $NH_3$. The operating temperature can thereby be defined by a start-up temperature of the SCR catalytic converter, above which the SCR catalytic converter reaches a noticeable activity for the selective $NO_x$ reduction with $NH_3$. The operating temperature can however also be characterized by a decomposition temperature, above which $NH_3$ is released in a noticeable manner from the added reagent. In both cases, the conditions for a selective $NO_x$ reduction with $NH_3$ in the SCR catalytic converter are not present or only to a small extent below the operating temperature. With the method according to the invention, a reduction especially of $NO_2$ is enabled below and above the operating temperature.

It was discovered by the inventors that, at least with certain types of SCR catalytic converter, especially carbon monoxide (CO), carbon dioxide ($CO_2$), hydrocarbons (HC), or water ($H_2O$) and/or other materials can adsorb at the adsorption centers for $NO_x$ in such a manner that an $NO_x$ adsorption in inhibited at these adsorption centers. The SCR catalytic converter is typically formed in such a manner that at least with comparatively low temperatures, the relevant adsorption centers can bind one or several of the mentioned or further materials in an adsorptive manner with a comparable or even stronger binding strength than $NO_x$. A prevention or at least a strong reduction of the $NO_x$ adsorption can however also be achieved alone in that the corresponding material is offered in a distinct excess compared to $NO_x$, and thus an occupancy of the adsorption centers with this material takes place in a preferred manner.

It was discovered by the inventors that, with a heating of the SCR catalytic converter, previously adsorbed and thus collected $NO_x$ is released especially in the form of $NO_2$ when reaching a desorption temperature, wherein high concentration values can occur. Due to the inhibited adsorption according to the invention, that is, completely prevented or highly reduced adsorption of $NO_x$, an enrichment of $NO_x$ is avoided in the catalytic converter. An increased emission of $NO_2$ due to a desorption is thus inhibited during the heating of the SCR catalytic converter above the desorption temperature and also below the operating temperature. Further, it is avoided by the inhibition of a $NO_x$ adsorption at low temperatures according to the invention that a formation of nitric acid and/or nitrous acid takes place in the SCR catalytic converter, which can effect a damage of the SCR catalytic converter or of parts of the exhaust gas purification system on the one hand, and can appear by means of an emission of undesired and highly toxic nitrous gases with a thermal desorption on the other hand. For a reduction of the $NO_x$ emission altogether, it is thereby advantageous if a material is used for the adsorption at the mentioned adsorption centers, with which a $NO_2$ reduction or generally a $NO_x$ reduction even below the operating temperature is possible for the SCR catalytic converter.

In the arrangement of the method according to the invention, the exhaust gas is enriched with hydrocarbons for preventing an adsorption of nitrogen oxides. An enrichment with low-molecular hydrocarbons is especially preferred. With regard to an effective catalyzation of the selective $NO_x$ reduction with $NH_3$ and also a blocking of adsorption centers and/or a low temperature reduction of $NO_x$ with the supplied hydrocarbons, a SCR catalytic converter is especially suitable, which contains a solid acid. A dosing with a transition metal as e.g., iron (Fe) or a metal of the platinum group as e.g., platinum (Pt) can be provided additionally. The corresponding adsorption centers are thereby preferably formed as Lewis and/or Brönstedt acid centers. The possibly present transition or platinum metal center can also be effective as an adsorption center for $NO_x$ and for hydrocarbons. Such an embodiment of the SCR catalytic converter can also be advantageous with regard to other additives for blocking the $NO_x$ adsorption centers.

The object of the invention is also achieved in that, with a lean burning motor vehicle internal combustion engine, with an exhaust gas purification system with a SCR catalytic converter enabled for the reduction of nitrogen oxides ($NO_x$) under oxidizing conditions, and a device for enriching the exhaust gas with ammonia and/or a reagent enabled for splitting off ammonia arranged upstream of the SCR catalytic converter, the total emission of nitrogen oxides of the motor vehicle is decreased below a predeterminable first amount by supplying the SCR catalytic converter with an exhaust gas enriched with ammonia above an operating temperature, and the portion of nitrogen dioxide ($NO_2$) at the total emission of nitrogen oxides ($NO_x$) is decreased below a predeterminable second amount by converting nitrogen dioxide ($NO_2$) with hydrocarbons stored in the SCR catalytic converter.

The predeterminable first and second amounts are preferably an amount of the respective material defined by its mass, which is passed to the environment in a certain predetermined driving distance and/or in a predetermined collective of drive and/or operating states.

The lowering of the $NO_x$ total emission thereby takes place mainly or at least to a considerable part by the SCR catalytic converter. For this, an enrichment of the exhaust gas with ammonia takes place above its operating temperature. Thereby, ammonia and/or a reagent for splitting off ammonia are added to the exhaust gas upstream of SCR catalytic converter. An enrichment of the exhaust gas with ammonia can however also take place by a component of the exhaust gas purification system. It can additionally be provided to reduce a portion of the $NO_x$ raw emission of the internal combustion engine by one or several other exhaust gas purification units enabled for $NO_x$ reduction, which are preferably connected upstream of the SCR catalytic converter in the exhaust gas purification system.

For reducing the portion of nitrogen dioxide $NO_2$ in the total emission of nitrogen oxides ($NO_x$), an exhaust gas enriched with hydrocarbons is preferably supplied to the SCR catalytic converter especially below the operating temperature. The SCR catalytic converter is preferably formed in such a manner that it can adsorb the hydrocarbons increasingly present in the exhaust gas at least below the operating temperature and/or can catalyze a reduction of $NO_2$ with these hydrocarbons. In this manner, a reduction of the emission of $NO_x$ in general and especially of $NO_2$ is enabled with a normal operating temperature of the SCR catalytic converter, and also below this temperature.

With a normal operating temperature, that is, above the operating temperature, an $NO_x$ reduction takes place by selective reduction at or in the SCR catalytic converter by means of $NH_3$. However, this is not possible (or is possible only to a low degree) below the operating temperature. The inventors have however discovered that especially below the operating temperature, $NO_2$ supplied to the SCR catalytic converter and/or which is adsorbed in the SCR catalytic converter can be can be converted to NO or to $N_2$ by means of hydrocarbons stored in the SCR catalytic converter. The portion of the particularly damaging $NO_2$ at the total emission falls thereby. By means of stored hydrocarbons, for example due to blocked reaction or adsorption centers, a heterogeneously catalyzed NO oxidation to $NO_2$ can also be avoided, whereby the $NO_2$ emission is also reduced. Alternatively or parallel, a low temperature reduction of $NO_x$ to $N_2$ can be catalyzed by the SCR catalytic converter with HC present in the exhaust gas in an increased manner. The use of an SCR catalytic converter optimized for the mentioned functions is preferably provided. By means of the method according to the invention, a reduction of the emission of at least the $NO_2$ portion of $NO_x$ contained in the exhaust gas can also be achieved below the operating temperature.

In a further arrangement of the invention, the supply of exhaust gas enriched with hydrocarbons to the SCR catalytic converter takes place during a warm-up phase and/or during an idling phase and/or a coasting mode of the internal combustion engine. The operating temperature is not yet reached in these operating states, or a cooling below these can occur. The SCR catalytic converter is thus typically not available for a selective $NO_x$ reduction with $NH_3$ in these operating phases and possibly also some time after their completion. If the exhaust gas is enriched with hydrocarbons at least intermittently in these operating phases, the effects mentioned above with regard to undesired $NO_x$ or $NO_2$ emission can be avoided or at least diminished. If oxidation catalytic exhaust gas purification components are connected upstream of the SCR catalytic converter, they can still or already be active in the mentioned operating states with regard to an oxidation of NO to $NO_2$, even if the SCR catalytic converter is not above its operating temperature. Due to the enrichment of the exhaust gas with hydrocarbons according to the invention, it is enabled to prevent an adsorptive enrichment of $NO_2$ generated upstream in the SCR catalytic converter and/or to convert generated $NO_2$ to NO and/or $N_2$ by a catalyzed reaction at the SCR catalytic converter with the hydrocarbons and to make them more or less harmless.

In a further arrangement of the method according to the invention, an enrichment of the exhaust gas with hydrocarbons is ended and an enrichment of the exhaust gas with ammonia is started, if, starting from a temperature of the SCR catalytic converter below an operating temperature, the operating temperature of the SCR catalytic converter is exceeded. In this manner, the duration of the enrichment phase and the use of hydrocarbons is kept low and an early reduction of $NO_x$ by selective reduction by means of $NH_3$ is ensured.

In a further arrangement of the method, an enrichment of the exhaust gas with hydrocarbons takes place by an incomplete combustion of fuel supplied from the internal combustion engine. This is preferably realized by an afterinjection of fuel into a combustion chamber of the internal combustion engine with an altogether lean air-fuel ratio. The enrichment of the exhaust gas with preferably low molecular hydrocarbons and/or carbon monoxide can however also be achieved by a combustion with an altogether rich lambda value of about 0.95 to 0.8.

In a further arrangement of the method, an enrichment of the exhaust gas with hydrocarbons takes place through a separate supply unit. The supply unit can for example be formed as a pure evaporator unit for evaporating the fuel used by the internal combustion engine. An embodiment as a crack unit for the catalytically supported or thermal cracking, especially with partial oxidation of the fuel is however preferred, as reactive and/or adsorptive highly effective species can be generated with such a supply unit. A reformation running simultaneously with generation of carbon monoxide and/or hydrogen is thereby advantageous.

In a further arrangement of the method, with an exhaust gas purification system with a oxidation-catalytically effective exhaust gas purification component connected upstream of the SCR catalytic converter, starting with a temperature of the SCR catalytic converter below the operating temperature, an enrichment of the exhaust gas with hydrocarbons upstream of the oxidation-catalytically effective exhaust gas purification component is ended when the oxidation-catalytically effective exhaust gas purification component reaches a noticeable activity for the oxidation of hydrocarbons. It is ensured in this manner that hydrocarbons supplied to the exhaust gas are not oxidized partially or predominantly before they reach the SCR catalytic converter. Preferably, the temperature of the oxidation-catalytically effective exhaust gas purification component is monitored by a temperature sensor, and when reaching its start-up temperature with regard to an oxidation of the hydrocarbons, the enrichment is ended. The oxidation-catalytically effective exhaust gas purification component can be an oxidation catalytic converter, a three-way catalytic converter, a nitrogen storage catalytic converter and/or a catalytically coated particle filter.

The enrichment of the exhaust gas with hydrocarbons is ended in a further arrangement of the invention, when the exhaust gas downstream of the SCR catalytic converter has a predeterminable content of hydrocarbons, and/or when the SCR catalytic converter has a predeterminable charge with hydrocarbons. In this manner, a discharge of hydrocarbons to the environment is avoided. For monitoring the hydrocarbon content downstream of the SCR catalytic converter, a lambda sensor or another sensor sensitive with regard to hydrocarbons can be used. It is however also possible to determine by means of known material data of the SCR catalytic converter and the amount of exhaust gas, at which time the catalytic converter has adsorbed a sufficient amount of hydrocarbons. In this manner, an undesired slip of hydrocarbons can also be avoided.

In a further arrangement of the method, an SCR catalytic converter based on zeolite is used. Zeolite catalytic converters have been proven to be especially suitable for the catalyzation of a selective nitrogen oxide reduction by means of $NH_3$ and can furthermore possibly have a more or less strong capability for the adsorption of hydrocarbons and nitrogen oxides.

Advantageous embodiments of the invention are described in the following with reference to a drawing. The above-mentioned characteristics, which are to be explained in the following, can thereby not only be used in the respectively given characteristics combination, but also in other combinations or on their own without leaving the scope of the present invention.

BRIEF DESCRIPTION OF THE DRAWINGS

The single FIGURE is a schematic block diagram of an internal combustion engine with an exemplary embodiment of an associated exhaust gas purification system.

DETAILED DESCRIPTION OF THE DRAWINGS

The internal combustion engine 1 is preferably an air-compressing internal combustion engine (hereinafter simply called Diesel engine). The exhaust gas emitted by the Diesel engine 1 is received by an exhaust gas line 2 and sequentially flows through an oxidation catalyst 3, a particle filter 4 and an SCR catalytic converter 5. A supply unit 26 for enriching the exhaust gas with HC or a fuel is provided upstream of the oxidation catalytic converter 3. A supply of HC or a fuel (as, for example, Diesel fuel) can be provided for heating the exhaust gas or of purification-effective components installed in the exhaust gas line 2. A heating of the exhaust gas by exothermal oxidation of added fuel or HC by the oxidation catalytic converter 3 is especially considered during a regeneration of the particle filter 4 by soot combustion. A determination of the necessity of such a regeneration can take place based on a model and/or with the help of a differential pressure sensor 22 associated with the particle filter 4, by means of whose output signal a critical particle charge of the particle filter 4 can be determined. An exhaust gas heating can however also be provided in connection with a cold start or warm-up of the Diesel engine 1 and/or generally if an undesired low exhaust gas temperature level is determined, especially on the input side of the SCR catalytic converter 5. By means of the oxidation catalytic converter 3, an increase of the NO2 portion of $NO_x$ contained in the exhaust gas is additionally enabled. An oxidation of soot deposited in the particle filter 4 at exhaust gas temperatures below 500° C. is thereby enabled on the one hand, and also an improved nitrogen oxide conversion in the SCR catalytic converter 5 is enabled at normal operating conditions. Possibilities for reducing or avoiding an emission of $NO_2$ under conditions which are unfavorable for a conversion of $NO_2$ once generated, is addressed in the following.

An exhaust gas turbocharger 6 is further associated with the Diesel engine 1, whose turbine is driven by the exhaust gas flow and whose compressor supplies air to the Diesel engine taken in via an air supply line 11 via an intake air line 7. For adjusting the air amount supplied to the Diesel engine 1, a throttle 12 is arranged in the air supply line 11. For purifying the intake air or for measuring the intake air amount, an air filter 8 or an air mass meter 9 are arranged in the intake air line 7. A charge-air cooler 10 arranged in the air supply line 11 serves for cooling the compressed intake air. A bypass, which is preferably controllable, can be provided for the charge-air cooler. The Diesel engine 1 preferably additionally has an exhaust gas return device, not shown, via which exhaust gas taken from the exhaust gas line 2 can be admixed to the combustion air supplied to the Diesel engine 1 in a quantitatively controllable manner. A cooler can also be provided for returned exhaust gas. With an adjustment of charge-air and exhaust gas return amount tailored to suit and their cooling, a control of the fuel combustion in the combustion chambers of the Diesel engine 1 with regard to an optimum fuel usage, but also with regard to an adjustment of $NO_x$ and soot raw emission values and with regard to a possibly desired increase of the exhaust gas temperature is enabled. A further adjustment possibility of the mentioned operating magnitudes is enabled by an intake air throttling carried out tailored to need by means of actuation of the throttle 12.

A supply device with a dosing valve 27 for supplying a reduction means to the exhaust gas is arranged upstream of the SCR catalyst 5. The supply of the dosing valve 27 with the reduction means takes place from a container, not shown here. It is assumed in the following that the reduction means is aqueous urea solution. However, another reduction means can also be used, especially a reduction means which contains ammonia ($NH_3$) in a free or chemically bonded manner. The urea solution is dosed to the exhaust gas via the dosing valve 27 tailored to need. In the hot exhaust gas, $NH_3$ is released by thermolysis and/or hydrolysis, which acts selectively with regard to a $NO_x$ reduction. A highly effective catalytic converter for this is a SCR catalytic converter 5 based on zeolite or based on $V_2O_5/W_2O_3/TiO_2$, which typically has adsorption centers for $NO_x$ and $NH_3$ for its use of the heterogeneously catalyzed selective $NO_x$ reduction with $NH_3$. The SCR catalytic converter can be formed as a full extrudate or as a layered catalytic converter.

For controlling the operation of the exhaust gas purification system and of the Diesel engine 1, a control device, not shown, is provided. The control device has information about operating state variables of the Diesel engine 1 for fulfilling the provided control functions. This can e.g., by information about the issued torque or the speed. The control device preferably comprises a calculating unit and a storage unit and an input-output unit. The control device is thereby capable to carry out complex signal processing processes and to detect the operation of the Diesel engine 1 and of the SCR exhaust gas aftertreatment system and to control or regulate it. Characteristics necessary for this are preferably deposited in the storage device, wherein an adaptive adjustment of the characteristics can also be provided. The characteristics mainly relate to the relevant state variables of the exhaust gas, as mass flow, raw emission, temperature in dependence on the operating characteristics of the Diesel engine 1 such as load, speed, air ratio number etc. Further, characteristics for the relevant state variables of the oxidation catalytic converter 3, the particle filter 4 and the SCR catalytic converter 5 are provided. With regard to the SCR catalytic converter 5, these characteristics especially relate to the $NO_x$ conversion and the $NH_3$ or the HC storage capacity in dependence on the parameters decisive for this.

The sensing of the operating states of the Diesel engine 1 and of the SCR exhaust gas purification system and the associated units preferably takes place by means of suitable sensors. Pressure sensors 13 and 15 for a pressure in front of the compressor and a pressure in front of the turbine of the turbocharger 6 and temperature sensors 16, 18, 19, 21, 23 and 24 for respectively a temperature after the charge-air cooler 10, in front of the turbine, in front of the oxidation catalytic converter 3, in front and behind the particle filter 4, and in front and behind the SCR catalytic converter 5 are exemplary. Further sensors, especially for sensing exhaust gas components can also be provided. A lambda sensor 17 and a $NO_x$ sensor 20 are for example provided for the $NO_x$ content in the exhaust gas. An exhaust gas sensor 25 is especially provided on the output side of the SCR catalytic converter 5, which has a sensitivity with regard to $NO_x$ and $NH_3$ or with regard to HC. The $NO_x$ sensor 20 can also be arranged downstream of the particle filter 4, is however preferably upstream of the dosing valve 27. The signals of the sensors are processed by the control unit, so that the essential state variables are present at any time and the operating point of the Diesel engine 1 can be changed if necessary in such a manner that an optimum operation of the exhaust gas purification system is enabled.

The illustrated functionality can naturally be expanded or improved within the scope of the invention by additional exhaust gas purification components, as for example a nitrogen oxide storage catalytic converter and/or a hydrolysis catalytic converter in front of the SCR catalytic converter 5. It is especially advantageous to provide a nitrogen oxide storage catalytic converter upstream of the particle filter 4 and/or between the particle filter 4 and the SCR catalytic converter 5. In rich operating phases, previously stored $NO_x$ can be partially reduced to ammonia with a regeneration of the nitrogen oxide storage catalytic converter, and the exhaust gas can be enriched with ammonia in this manner. An external supply of urea can possibly even be foregone in such an arrangement. A further oxidation catalytic converter can furthermore be provided downstream of the SCR catalytic converter 5, by which residual parts of $NH_3$ and/or HC in the exhaust gas can be removed. Changes of the sensor system with regard to the type, number and arrangement of the sensors are also possible.

The explained embodiments of an exhaust gas purification system have proven to be especially advantageous with regard to an effective removal of the essential exhaust gas pollutants, especially with regard to $NO_x$ and particles. A total emission of $NO_x$ can for example be achieved below a predeterminable amount of 80 mg per driven kilometer in a collective of operating states by a reduction of nitrogen oxides in the exhaust gas purification system, especially in the SCR catalytic converter 5. For this, the exhaust gas is enriched with ammonia above the operating temperature, preferably by adding urea solution tailored to need to the exhaust gas. An operating state-dependent charging of the SCR catalytic converter with ammonia is preferably adjusted by a charging model or sensor-controlled in such a manner that nitrogen oxides contained in the exhaust gas can be reduced in the necessary amount. With a reduced performance capability of the SCR catalytic converter depending on the temperature or due to other circumstances, the $NO_x$ raw emission of the Diesel engine can be reduced in such a manner that the predetermined $NO_x$ emission values can be kept.

With some operating states, however (for example during and after a cold start or during driving states which last longer with low engine load, such as coasting or idling operation), critically low exhaust gas temperatures can occur, where significant material conversions cannot proceed, or cannot proceed with the sufficient speed. This can lead to an undesired emission of pollutants. For a selective catalytic $NO_x$ reduction at the SCR catalytic converter 5 and a thermolytic or hydrolytic release of $NH_3$ from urea, exceeding a certain operating temperature (typically in the region of about 170° C. to 250° C.) is for example necessary. For other catalytic conversions in the exhaust gas purification system, exceeding a start-up temperature of the respective exhaust gas aftertreatment unit is necessary. For example, NO at low temperatures (about 200° C.) is oxidized as hydrocarbons (about 250° C.) by the oxidation catalyst 3.

In the following, advantageous measures are addressed, which enable a reduction of the emission, especially of $NO_2$ even with the mentioned critical conditions. By means of the measures explained in more detail below, a further improved reduction of the total $NO_x$ emission below a predeterminable or predetermined amount (for example 10 mg per kilometer driven or a portion of 10% of the $NO_x$ total emission) is achieved.

The inventors have discovered that an undesirably high emission of $NO_2$ can mainly be attributed to two effects, especially with temperatures below the operating temperature. On the one hand, $NO_x$ contained in the exhaust gas can be adsorbed by the SCR catalytic converter 5 and thus enriches in the SCR catalytic converter. With a heating above a catalytic converter-specific desorption temperature, adsorbed $NO_x$ is concentrated and discharged mainly in the form of $NO_2$. On the other hand, $NO_x$ or $NO_2$ contained in the exhaust gas from the outset, can pass the SCR catalytic converter 5 under conditions, where no adsorption takes place or no conversion with ammonia is possible.

The inventors have discovered that the resulting $NO_2$ emission problem can be solved by an enrichment of the exhaust gas with hydrocarbons upstream of the SCR catalytic converter 5. An enrichment concentration of about 100 ppm to about 10000 ppm, related to $(HC)_3$ is thereby advantageous. An enrichment concentration of about 200 ppm to 5000 ppm is preferred. An enrichment concentration in the region between 500 ppm and 2000 ppm is particularly preferred. HC present in an increased manner in the exhaust gas can adsorb on the one hand at adsorption centers of the SCR catalytic converter 5 in such a manner that an adsorption of $NO_x$ is prevented or at least highly diminished. An enrichment of $NO_x$ in the SCR catalytic converter 5 and a corresponding $NO_2$ desorption peak is thereby avoided. On the other hand, intramolecular bondings are weakened due to the adsorption, which is why adsorbed hydrocarbons have a high reaction capability and $NO_2$ contained in the exhaust gas can also be reduced at least to NO, and largely even to harmless $N_2$, even with oxygen excess and low temperatures. Such a reduction is however also possible with HC contained in the gaseous phase, even though it is typically less pronounced.

As the inventors have discovered, for a high effectiveness in the mentioned sense, the use of a material for the SCR catalytic converter 5 is advantageous, which has Lewis and Brönstedt acid centers. A catalytic converter based on zeolite is preferably used, for example a zeolite of the beta, ZSM5, MFI or mordenite type. However, another zeolite can also be used. A zeolite with a Hammet acidity of less than –3 is preferred, especially of less than –5. The zeolite can be used in its H form or ion-exchanged with a transition metal such as e.g., manganese (Mn), iron (Fe), copper (Cu) or a metal of the platinum group as e.g., platinum (Pt), palladium (Pd), rhodium (Rh). The acid centers and the metal centers can thereby be effective as adsorption centers and/or as catalytic centers. Alternatively or additionally, an enrichment of the exhaust gas with CO can also be provided especially for the temperature-dependent blocking of an adsorption center formed by Pt.

It is provided to control the enrichment of the exhaust gas with HC with regard to the addition time and/or addition amount in such a manner that an undesired HC desorption or HC emission is avoided. To this end, the amount supplied to the exhaust gas is conveniently summed and compared to given nominal values. It is thereby convenient to give the nominal values in advance for the corresponding characteristics determined for the SCR catalytic converter 5 in temperature and throughput dependence. If a critical charging of the SCR catalytic converter 5 is reached with regard to desorption or slip, the enrichment of the exhaust gas is ended. Instead of a control of the HC charging based on calculation or a model, a measurement-technical control can also be provided by means of an exhaust gas sensor sensitive with regard to HC downstream of the SCR catalytic converter 5. Generally, it is provided within the scope of the procedure for reducing $NO_2$ emissions at low operating temperatures according to the invention to end the HC enrichment at the latest when the operating temperature of the SCR catalytic converter 5 is reached or exceeded and to switch over to a $NO_x$ reduction by $NH_3$ enrichment provided for the normal operation. For an addition of urea via the dosing valve 27 tailored to need for the purpose of the $NH_3$ enrichment, it should be ensured that the exhaust gas temperature is above the urea decomposition temperature.

The HC enrichment of the exhaust gas can take place by an adjustment of operating parameters of the Diesel engine 1 suitable for this in such a manner that an incomplete fuel combustion takes place in one or several combustion chambers. A time for a fuel afterinjection is preferably chosen in such a manner that the afterinjected fuel takes place in the fading or already faded combustion of the main injection used for the operation. Depending on how the start and duration of the afterinjection are chosen, an enrichment of the exhaust gas with more or less strongly cracked or partially combusted hydrocarbons can be achieved.

The HC enrichment of the exhaust gas can alternatively or additionally also by conducted by the separate supply unit 26. The HC enrichment of the exhaust gas upstream of the oxidation catalytic converter 3 is preferably switched off if the oxidation catalytic converter 3 or possibly also the particle filter 4 develops a noticeable activity for the HC oxidation (that is, if the corresponding startup temperature is reached). The supply unit 26 arranged in front of the oxidation catalytic converter 3 can however also be used advantageously for heating the exhaust gas in that HC is supplied above the start-up temperature and is oxidized at the oxidation catalytic converter 3 and/or at the particle filter 4 while releasing heat. This is especially provided in connection with a thermal regeneration of the particle filter 4, but can also take place with other operating states, if a heating of the exhaust gas purification system is desired.

It can also be provided to alternatively or additionally arrange a corresponding supply unit between the particle filter 4 and the SCR catalytic converter 5. This embodiment enables to supply exhaust gas enriched with HC even if the oxidation catalytic converter 3 or the particle filter 4 have already reached their startup temperature.

It is generally preferred if the operating temperature of the Diesel engine or of the HC supply unit is adjusted in such a manner that HC with less than ten carbon atoms (especially preferred, with less than eight carbon atoms) is produced. These HC fractions have been proven to be especially effective with regard to an adsorption also of $NO_x$ preferred adsorption centers of the SCR catalytic converter 5, as also with regard to a catalyzed reduction of NO or $NO_2$ below the operating temperature. It is also advantageous, if, during a warm-up, idling and/or coasting operation accompanying the HC enrichment of the exhaust gas, an operating parameter adjustment for the internal combustion engine 1 is taking place in such a manner that a quick heating of the SCR catalytic converter 5 takes place via the operating temperature or a low $NO_x$ raw emission results. For a quick heating, an exhaust gas return and/or a cooling of returned exhaust gas and/or a charge-air cooling until reaching a certain coolant temperature can be switched off. For a low $NO_x$ raw emission, the Diesel engine 1 can be operated with a comparatively high exhaust gas return rate; that is, with approximately or completely opened exhaust gas return valve. It is also generally advantageous for a low basic value, if the Diesel engine 1 is operated with a low compression ratio. A compression ratio of less than 16 is preferred with a Diesel engine.

It is additionally advantageous for a low $NO_2$ emission, if, accompanying the mentioned measures for the oxidation catalytic converter 3 and/or the particle filter 4, a coating is chosen, which has a low NO oxidation activity. This can for example be achieved by a comparatively low Pt content of less that 70 g/ft³, preferably of less than 50 g/ft³ and especially preferred of less than 30 g/ft³. For maintaining the HC oxidation activity, a correspondingly higher Pd content can be provided, wherein a Pd/Pt ratio of at least 0.2 is preferred, and of at least 0.5 is especially preferred.

For the adherence to a predeterminable amount for the NO₂ emission, a measurement-technical NO₂ sensing on the end side in the exhaust gas system can also be provided, for example by means of the exhaust gas sensor 25. In dependence on the sensed NO₂ emission values or on the sensor signal, the measures illustrated above can be resorted to on their own or in combination. Especially for reducing the NO₂ emission after a cold start, it can also be provided that, with a vehicle out of operation or Diesel engine 1, hydrocarbons are guided to the SCR catalytic converter 5, for example by short-term injection, so that they can adsorb there. In this manner, it is achieved that the SCR catalytic converter 5 is already precharged with HC at the beginning of the cold start. Thereby, an emission of NO and especially of NO₂ is directly reduced starting with the engine start-up.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for reducing nitrogen dioxide emissions in a lean burning internal combustion engine having a connected exhaust gas purification system that includes an SCR catalytic converter for reducing nitrogen oxides with ammonia under oxidizing conditions, and a device arranged upstream of the SCR catalytic converter for enriching the exhaust gas with ammonia and/or a reagent enabled for splitting off ammonia said SCR catalytic converter having adsorption centers for nitrogen oxides; said method comprising:
    above an operating temperature at which the SCR catalytic converter can reduce significantly nitrogen oxides with ammonia under oxidizing conditions, exhaust gas supplied to said SCR catalytic converter is enriched with ammonia; and
    below said operating temperature, the exhaust gas supplied to the SCR catalytic converter is enriched with a material which adsorbs at least partially on said adsorption centers, in such a manner that adsorption of nitrogen oxides on said adsorption centers is inhibited, wherein
        for inhibiting adsorption of nitrogen oxides at said adsorption centers, the exhaust gas is enriched with hydrocarbons,
        said exhaust gas purification system includes an oxidation-catalytically effective exhaust gas purification component connected upstream of the SCR catalytic converter; and
        enrichment of the exhaust gas with hydrocarbons is ended when
            the SCR catalytic converter has a predeterminable charge with hydrocarbons, the predeterminable charge with hydrocarbons being an amount sufficient to inhibit adsorption of nitrogen oxides at the adsorption centers.

2. The method according to claim 1, wherein exhaust gas enriched with hydrocarbons is supplied to the SCR catalytic converter during at least one of a warm-up phase, an idling phase, and a coasting mode of the internal combustion engine.

3. The method according to claim 1, wherein enrichment of the exhaust gas with hydrocarbons is terminated and enrichment of the exhaust gas with ammonia is started, when, starting from a temperature of the SCR catalytic converter below the operating temperature, the operating temperature of the SCR catalytic converter is exceeded.

4. The method according to claim 1, wherein enrichment of the exhaust gas with hydrocarbons takes place by an incomplete combustion of fuel that is supplied to the internal combustion engine.

5. The method according to claim 1, wherein enrichment of the exhaust gas with hydrocarbons is performed by a separate supply unit.

6. The method according to claim 1, wherein said an SCR catalytic converter is based on zeolite.

7. The method according to claim 1, wherein said an SCR catalytic converter is based on zeolite.

8. A method for reducing emission of nitrogen dioxide in a lean burning internal combustion engine having a connected exhaust gas purification system that includes an SCR catalytic converter for reducing nitrogen oxides with ammonia under oxidizing conditions, and a device arranged upstream of the SCR catalytic converter for enriching the exhaust gas with ammonia and/or a reagent enabled for splitting off ammonia, wherein:
    above an operating temperature at which the SCR catalytic converter can reduce nitrogen oxides with ammonia under oxidizing conditions in a noticeable amount, reducing total emission of nitrogen oxides of the motor vehicle below a first predeterminable amount by supplying an exhaust gas enriched with ammonia to the SCR catalytic converter;
    reducing a portion of nitrogen dioxide in the total emission of nitrogen oxides of the motor vehicle below a predeterminable second amount by converting nitrogen dioxide with hydrocarbons stored in the SCR catalytic converter;
    said exhaust gas purification system includes an oxidation-catalytically effective exhaust gas purification component connected upstream of the SCR catalytic converter; and
    enrichment of the exhaust gas with hydrocarbons is ended when
        the SCR catalytic converter has a predeterminable charge with hydrocarbons, the predeterminable charge with hydrocarbons being an amount sufficient to inhibit adsorption of nitrogen oxides at the adsorption centers.

9. The method according to claim 8, wherein exhaust gas enriched with hydrocarbons is supplied to the SCR catalytic converter during at least one of a warm-up phase, an idling phase, and a coasting mode of the internal combustion engine.

10. The method according to claim 8, wherein enrichment of the exhaust gas with hydrocarbons is terminated and enrichment of the exhaust gas with ammonia is started, when, starting from a temperature of the SCR catalytic converter below the operating temperature, the operating temperature of the SCR catalytic converter is exceeded.

11. The method according to claim 8, wherein enrichment of the exhaust gas with hydrocarbons takes place by an incomplete combustion of fuel that is supplied to the internal combustion engine.

12. The method according to claim 8, wherein enrichment of the exhaust gas with hydrocarbons is performed by a separate supply unit.

13. The method according to claim 8, wherein said an SCR catalytic converter is based on zeolite.

\* \* \* \* \*